United States Patent [19]

Forrest

[11] Patent Number: 4,716,806

[45] Date of Patent: Jan. 5, 1988

[54] MUSICAL INDICATING APPARATUS

[76] Inventor: Frank D. Forrest, 2625 Brooks Ave., El Cerrito, Calif. 94530

[21] Appl. No.: 880,296

[22] Filed: Jun. 30, 1986

[51] Int. Cl.⁴ .............................................. G09B 15/02
[52] U.S. Cl. ...................................................... 84/474
[58] Field of Search .................... 84/471 SR, 473, 474

[56] References Cited

U.S. PATENT DOCUMENTS

| 490,509 | 1/1893 | Showalter | 84/474 |
|---|---|---|---|
| 554,172 | 2/1896 | De Meules | 84/473 |
| 3,592,099 | 7/1971 | Gibby | 84/473 |
| 3,960,046 | 6/1976 | Choong | 84/471 S |
| 4,552,052 | 11/1985 | Lee | 84/473 |

FOREIGN PATENT DOCUMENTS 18475  7/1882  Fed. Rep. of Germany ........ 84/474

Primary Examiner—Lawrence R. Franklin
Attorney, Agent, or Firm—Flehr, Hohbach, Test, Albritton & Herbert

[57] ABSTRACT

Musical indicating apparatus for finding chords, scales and transposing has a disk-like base with outer rings on both sides having the 12 notes of the chromatic musical scale. An inner rotatable disk on one side identical to the outer ring provides for transposition. On the other side an inner rotatable disk has 12 sectors corresponding to the 12 notes (or scales) of the outer ring. It is subdivided into several rings passing through all the sectors. A root sector has a kind of triad marked for each ring; e.g., major, minor, etc. In the same ring the other notes of the triad are marked. Finally the outer ring includes indicators which show at least 3 notes of a chord to be identified.

6 Claims, 5 Drawing Figures

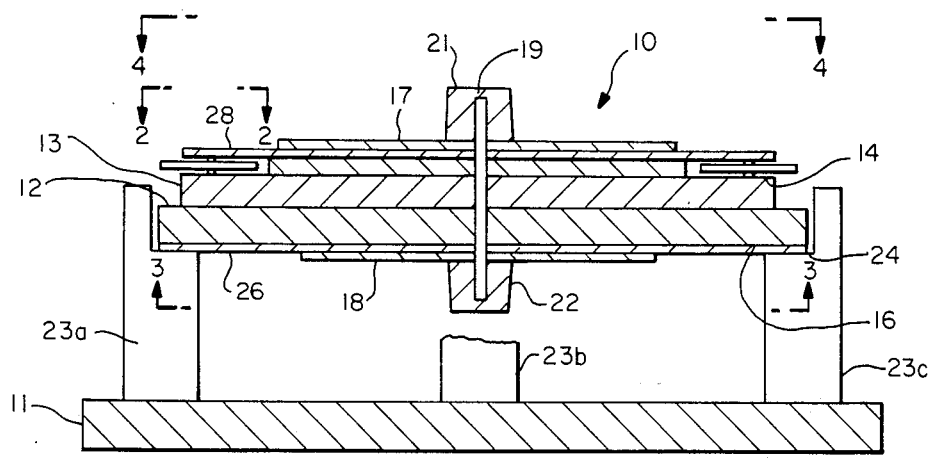
FIG.—1
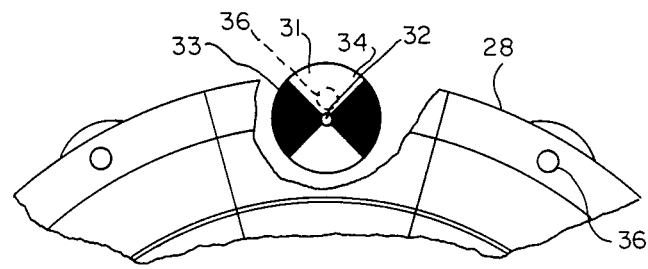
FIG.—2
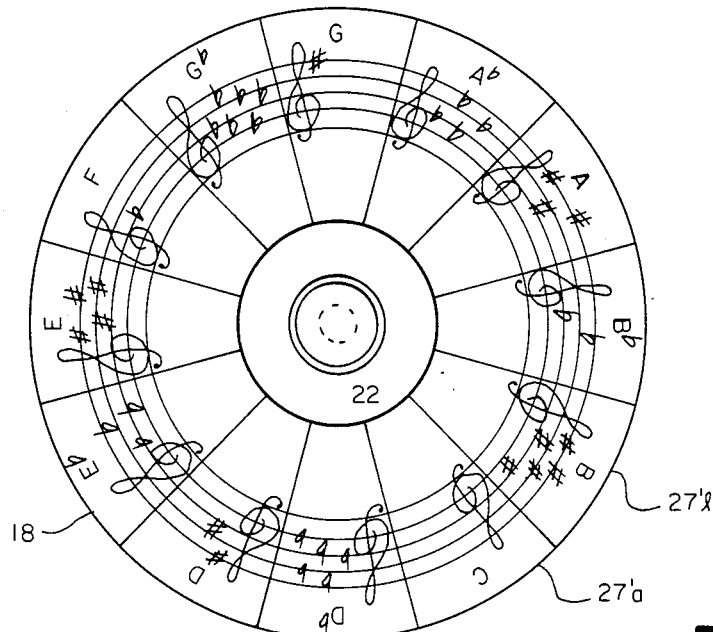
FIG.—3B

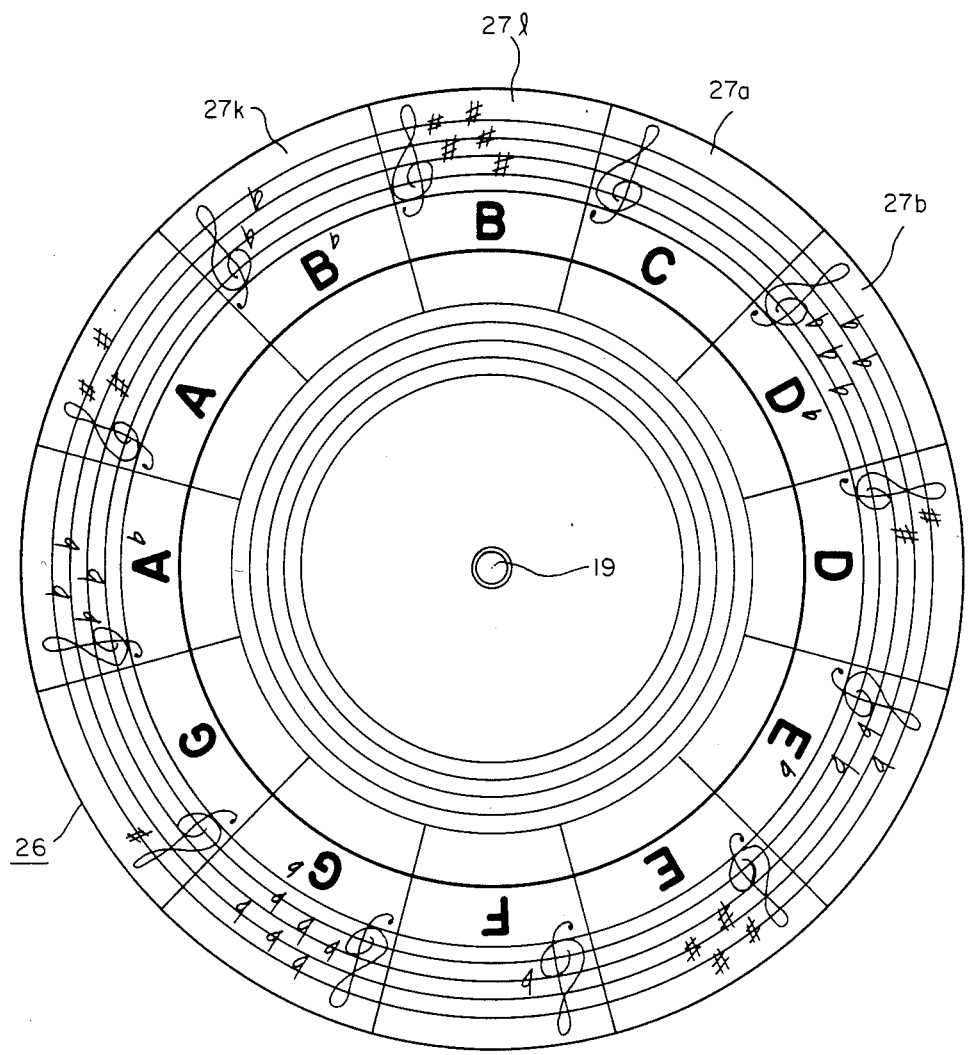
FIG. —3A

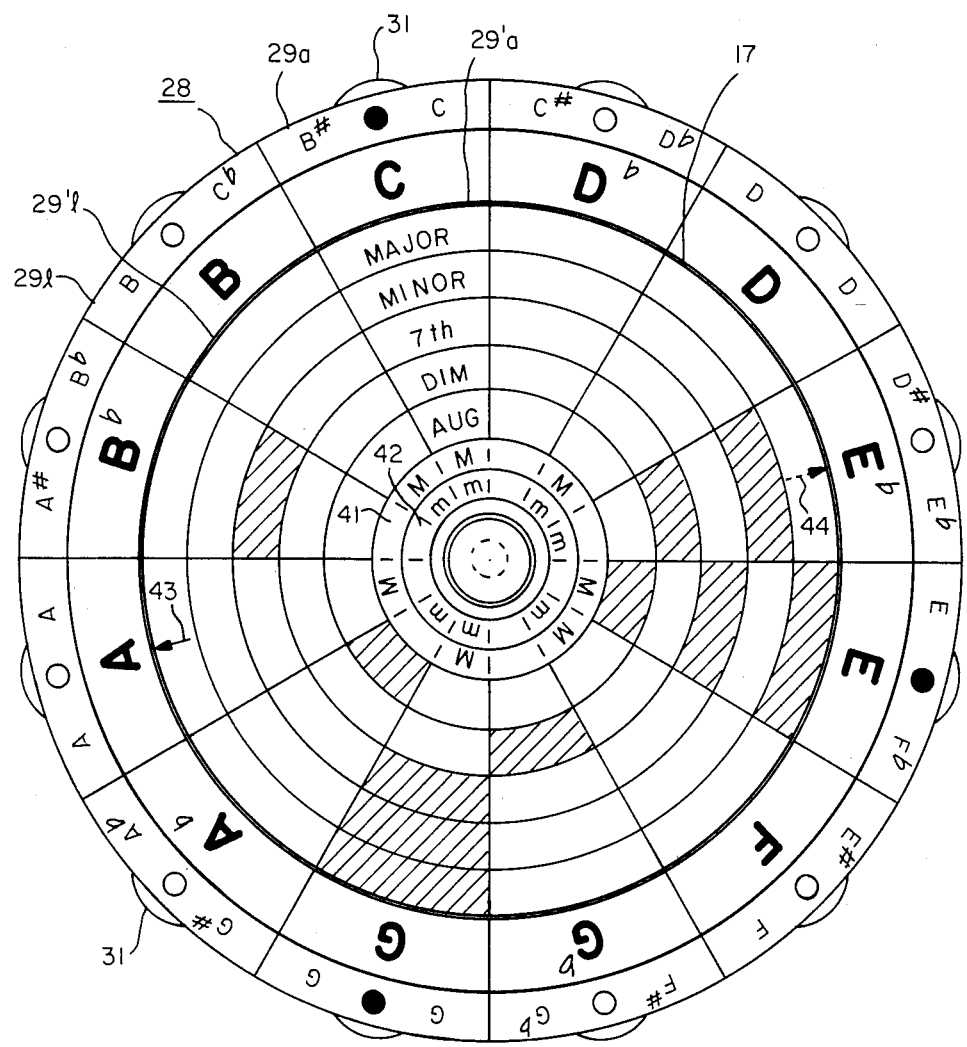
FIG.—4

MUSICAL INDICATING APPARATUS

The present invention is directed to musical indicating apparatus and more particularly to apparatus which has rotating members carrying the notes of a chromatic musical scale for use in finding chords, scales in general and transposing.

Since the basis of our harmonic system of western music is the triad (that is, three notes of a particular musical scale), it is necessary for those interested in music theory to learn the various permutations of triads for the various musical scales. Two of the most common kinds of triads are a major triad and a minor triad. There are many others.

Both scales and triad chords are set out in detail in music theory books. However, their arrangement is necessarily cumbersome and does not reveal the underlying musical concepts. With the advent of the microprocessor some of the musical theory books have essentially been stored ina microprocessor. For example, one type manufactured by the Korg Company of Japan will display various chords upon demand for all keys of the scale. But this is merely a time saving device which saves one from referring to a specific page in a music theory book.

OBJECT AND SUMMARY OF INVENTION

It is therefore a general object of the present invention to provide an improved musical indicating apparatus.

In accordance with the above object, there is provided musical indicating apparatus comprising a disk-like base having first and second faces. An outer ring fixed on said first face has in sequence indicia of the twelve notes of the chromatic musical scale. A rotatable disk is mounted on the one face within said outer ring and has radial indicia dividing its face into twelve pie-shaped sectors, each sector corresponding in any one of twelve positions of rotation to any one of the notes of the outer ring. The rotatable disk is subdivided into a plurality of rings crossing each sector. A root sector is marked with a plurality of kinds of triad chords, including at least one major triad and a minor triad, respectively, in each of the rings, with the same ring in at least two other sectors being especially marked to indicate the remaining notes of a particular kind of triad. Thus the user by observing the written notes of a triad on a piece of sheet music may rotate the rotatable disk so that three marked indicia will coincide with said notes of said outer ring, the predetermined root sector thus indicating the kind of triad.

DESCRIPTION OF DRAWINGS

FIG. 1 is a cross-sectional view enlarged out of proportion to show details of the musical apparatus embodying the present invention;

FIG. 2 is a top view of a portion of FIG. 1 substantially taken along the line 2—2, partially broken away, showing a feature of the present invention;

FIGS. 3A and 3B are plan views of disk-like portions of the invention taken along the line 3—3 of FIG. 1, but shown separately; and FIG. 4 is a plan view taken essentially along the line 4—4 of FIG. 1.

DESCRIPTION OF PREFERRED EMBODIMENT

FIG. 1 illustrates the musical indicating apparatus of the present invention, generally indicated as 10, as it would be installed horizontally on a four legged stand 11. Basically, the indicator apparatus 10 has a disk-like base made up of a lower portion 12 and a somewhat smaller in diameter upper portion 13, such base including a top face 14 and a bottom face 16. Both faces 14 and 16 carry respective rotatable disks 17 and 18 which are mounted for rotation with a center shaft 19 having knobs 21 on the upper face and 22 on the lower face. The user of the apparatus may utilize either face by merely picking up the apparatus unit 10 and turning it over and replacing it on the supports.

Specifically, the stand 11 includes four legs, three of which 23a, 23b, and 23c are illustrated (leg 23d is not shown). The legs provide shoulders 24 upon which the base 12 may rest.

On the lower face 16, in addition to the rotatable disk 18, this disk is rotatable and on top of a fixed outer ring 26; in other words, outer ring 26 is affixed to base portion 12. Such outer ring 26 is shown in FIG. 3A and includes twelve sectors, marked by lines from center 19 and designated 27a–27l indicated by the notes of the chromatic musical scale; that is, A through G with the various flats and sharps. Also, for convenience the number of flats or sharps for each scale (as indicated by the key-note of that scale) is shown. Within this outer ring is the inner rotatable disk 18 which is identical in construction but smaller. In other words, it has the identical sectors 27'a–27'l with markings indicating the notes of the chromatic scale again starting with C. In operation, when one wishes to transpose, the particular scale one wishes to go to is utilized on the inner disk and is placed with its sector in alignment with the original scale on the outer ring. In other words, if one is originally in the key of C, that is sector 27a, and wishes to go to the key of B flat, that is 27'k, these sectors are aligned. Then, to transpose the remaining notes in the original key of C, the relative transposition can be noted with respect to each juxtaposed sector.

Now referring briefly back to FIG. 1, and to the top face 14 of the base portion 13, the rotatable disk 17 is better illustrated in FIG. 4 where it is shown mounted for rotation on and within an outer ring 28. This ring is affixed to base portion 13. In a manner similar though to FIG. 3A, the ring has marked on it in sequence indicia indicating the twelve notes of the chromatic scale in the sectors 29a through 29 l. The sectors correspond to matching sectors in the rotatable disk 17 designated 29'a through 29'l.

As shown in FIG. 2, in conjunction with each sector 29a through 29l, there is an indicator in the form of a rotatable disk 31 which is mounted for rotation upon a center axis 32 by reason of its exposed periphery as best illustrated in FIG. 4. It is a bi-stable type indicator having a darkened portion 33 and a light portion 34 which, when the portions are displayed under the circular aperture 36, the face of the outer ring 28 indicates a choice of that note of the scale associated with that sector. For example in FIG. 4, the notes C, E and G have been selected with the indicator. Referring to the root sector 29a this is thus a major triad as indicated by the word "MAJOR" in the first inner ring designated "MAJOR".

The inner rotatable disk 17, as illustrated in FIG. 4 is subdivided in addition to the sectors into a plurality of rings or bands which cross each of the sectors. As illustrated, there are five rings which correspond to different kinds of musical triads and specifically are designated major, minor, dominant seventh, diminished and augmented.

Finally, two of the smallest rings of the inner rotatable disk 17, that is, 41 and 42, respectively, have sectors indicating the notes of a major or minor scale designated with "M" and "m". Naturally, each of the scales has seven notes. For example, with the root sector 29a located or juxtaposed with the "C" of the outer ring 28, the other notes of the "C Major" scale are D, E, F, G, A and B. Again, still referring to the situation where the rotatable disk is in the C-scale position, that is with the root sector 29'a in that position opposite the key note C, a major triad is indicated by following around in the "MAJOR" ring to the marked sectors. These show the other notes of the "C Major" chord which are respectively, E and G. With respect to a C Minor chord the other notes are E flat and G. With respect to the dominant seventh chord in the key of C, in addition to the root note of C, the other notes following around in that specific ring and looking at the marked indicia the notes are E, G and B flat. Similarly the diminished and augmented chords are appropriately marked. Rotation of the disk 17 to any other scale, for example a D scale, will allow the user to read off or determine various chords of that scale. It is obvious of course that there are different types of triads (including a dominant seventh which has four notes of course) which may be utilized. Thus in summary to obtain the notes of a chord the root sector 29'a is placed on the desired key and indicated by the note in that sector, and then the other notes of the chord are indicated by the marked areas. In order to simplify reading of the device the various inner rings of major/minor/seventh, etc., can be color coded also.

If it is desired to obtain a relative minor of a major key or a relative major of a minor key the arrows 43 and 44 can be utilized. Solid arrow 43 is located three notes away from the root sector 29'a and indicates the relative minor of the major key at which the root sector is located. For example, in the present position the relative minor scale of C Major is "a". Similarly, with the dashed arrow 44 if it is assumed that the root sector 29'a is located at a "c Minor" scale then the relative major of c Minor is indicated by the dashed arrow 44 which is E-flat. Then to determine the specific notes of the relative minor or major scale the root sector is notated to the key indicated by the arrow and the inner rings 41 and 42 are used.

With the use of the indicators 31 if the user observes for example the written notes of a triad on a piece of sheet music these three notes may be entered or indicated by rotating the appropriate indicators 31. Here as discussed above, C, E and G have been entered by the user. By observing the coincidence of the marked sectors for a particular inner ring, it is observed that these three notes define a C Major chord. This is a way of determining the type of triad.

Because of the unique graphical representation on the rotatable disk 17 it is very easy for the music student to determine the relationships of the different chords and conceptually how one kind of triad differs from another. For example in the case of the difference between a major and a minor triad it is well known that the third note in the scale in a minor key is flatted and this is indicated by the indicia in the E flat sector.

It is also apparent that the transposition technique utilizing the other face of the disk conveniently juxtaposes the musical information desired. If only one face is desired to be used for the same purpose, however, it is obvious that one of the inner rings of the rotating disk 17 illustrated in FIG. 4 could be marked instead with the notes of the chromatic scale. This would serve the same purpose.

Thus an improved musical indicating apparatus has been provided.

What is claimed is:

1. Musical indicating apparatus comprising:
a disk-like base having first and second faces;
an outer ring fixed on said first face said ring having in sequence, in twelve sectors, indicia of the twelve notes of the chromatic scale, each sector including bi-stable indicator means for selectively indicating the three notes of a triad which is to be identified;
a rotatable disk mounted on said one face within said outer ring and having radial indicia dividing its face into twelve pie-shaped sectors each sector corresponding in any one of twelve positions of rotation to any one of said notes and corresponding sector of said outer ring, said rotatable disk being subdivided into a plurality of rings crossing each sector, a root sector being marked with a plurality of kinds of triad chords, including at least one major triad and a minor triad, respectively in each of said rings, with the same ring in at least two other sectors being marked to indicate the remaining notes of a particular kind of triad; whereby the user by observing the written notes of a triad on a piece of sheet music may mark said notes by said bi-stable indicator means and rotate said rotatable disk so that three especially marked indicia will coincide with said marked notes of said outer ring, said predetermined root sector thus indicating the kind of triad.

2. An apparatus as in claim 1 where said rotatable disk includes a pair of inner rings having indicia marking the notes of major and minor musical scales respectively.

3. An apparatus as in claim 1, together with a stand means, upon which said apparatus may be placed horizontally, said stand means retaining said apparatus by the edge of said disk-like base, allowing for free rotation of said rotatable disk, said rotatable disk having a centrally affixed manually rotatable knob to provide said rotation.

4. An apparatus as in claim 1 where said bi-stable indicator means includes a rotatable disk located at each sector having two rotatable positions, one of which indicates that the sector which carries a particular note is to be identified.

5. An apparatus as in claim 1 where said second face has an outer ring having indicia of the twelve notes of said chromatic musical scale and including a inner rotatable disk with said corresponding twelve notes of the chromatic musical scale respectively in each sector whereby said inner disk may be rotated for use in transposition.

6. An apparatus as in claim 1 in which two of said sectors are marked with special indicia for indicating a relative major scale or a relative minor scale compared to said scale of said root sector, said indicia of said two segments being spaced three notes away from said root sector in opposite directions and indicating said relative scale by the juxtaposition of the special indicia opposite one of said twelve notes of said outer ring.

* * * * *